US010460741B2

(12) United States Patent
Liu et al.

(10) Patent No.: US 10,460,741 B2
(45) Date of Patent: *Oct. 29, 2019

(54) AUDIO CODING METHOD AND APPARATUS

(71) Applicant: Huawei Technologies Co., Ltd., Shenzhen (CN)

(72) Inventors: Zexin Liu, Beijing (CN); Bin Wang, Beijing (CN); Lei Miao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 9 days.

This patent is subject to a terminal disclaimer.

(21) Appl. No.: 15/699,694

(22) Filed: Sep. 8, 2017

(65) Prior Publication Data

US 2017/0372716 A1 Dec. 28, 2017

Related U.S. Application Data

(63) Continuation of application No. 15/362,443, filed on Nov. 28, 2016, now Pat. No. 9,812,143, which is a (Continued)

(30) Foreign Application Priority Data

Jun. 27, 2014 (CN) .......................... 2014 1 0299590
Aug. 26, 2014 (CN) .......................... 2014 1 0426046

(51) Int. Cl.
*G10L 19/00* (2013.01)
*G10L 15/00* (2013.01)
(Continued)

(52) U.S. Cl.
CPC ............ *G10L 19/12* (2013.01); *G10L 19/025* (2013.01); *G10L 19/06* (2013.01)

(58) Field of Classification Search
USPC ........................................ 704/219, 220, 254
See application file for complete search history.

(56) References Cited

U.S. PATENT DOCUMENTS 5,600,754 A 2/1997 Gardner et al.
6,104,992 A * 8/2000 Gao ...................... G10L 19/012 704/220

(Continued)

FOREIGN PATENT DOCUMENTS

CN 1081037 A 1/1994
CN 1420487 A 5/2003

(Continued)

OTHER PUBLICATIONS

Machine Translation and Abstract of Chinese Publication No. CN1420487, May 28, 2003, 5 pages.

(Continued)

*Primary Examiner* — Seong-Ah A Shin
(74) *Attorney, Agent, or Firm* — Conley Rose, P.C.

(57) ABSTRACT

An audio coding method and apparatus, where the method includes, for each audio frame in audio, when a signal characteristic of the audio frame and a signal characteristic of a previous audio frame meet a preset modification condition, determining a first modification weight according to linear spectral frequency (LSF) differences of the audio frame and the LSF differences of the previous audio frame, modifying a linear predictive parameter of the audio frame according to the determined first modification weight, and coding the audio frame according to a modified linear predictive parameter of the audio frame. According to the present disclosure, audio having a wider bandwidth can be coded while a bit rate remains unchanged or a bit rate slightly changes and a spectrum between audio frames is steadier.

20 Claims, 4 Drawing Sheets

Related U.S. Application Data continuation of application No. PCT/CN2015/074850, filed on Mar. 23, 2015.

(51) Int. Cl.

| | |
|---|---|
| ***G10L 19/12*** | (2013.01) |
| ***G10L 19/06*** | (2013.01) |
| ***G10L 19/025*** | (2013.01) |

(56) References Cited

U.S. PATENT DOCUMENTS

| | | | | |
|---|---|---|---|---|
| 6,188,980 | B1 * | 2/2001 | Thyssen | G10L 19/012 704/230 |
| 6,199,040 | B1 * | 3/2001 | Fette | G10L 19/00 704/219 |
| 6,233,550 | B1 * | 5/2001 | Gersho | G10L 19/10 704/208 |
| 6,330,533 | B2 | 12/2001 | Su et al. | |
| 6,385,573 | B1 * | 5/2002 | Gao | G10L 19/012 704/220 |
| 6,449,590 | B1 * | 9/2002 | Gao | G10L 19/012 704/219 |
| 6,493,665 | B1 * | 12/2002 | Su | G10L 19/012 704/230 |
| 6,636,829 | B1 * | 10/2003 | Benyassine | G10L 19/005 704/201 |
| 6,782,360 | B1 * | 8/2004 | Gao | G10L 19/083 704/222 |
| 6,931,373 | B1 | 8/2005 | Bhaskar et al. | |
| 7,720,683 | B1 * | 5/2010 | Vermeulen | G10L 15/22 704/235 |
| 8,532,984 | B2 | 9/2013 | Rajendran et al. | |
| 8,744,847 | B2 * | 6/2014 | Paul | G10L 17/16 434/156 |
| 8,938,390 | B2 * | 1/2015 | Xu | A61B 5/7264 704/231 |
| 2003/0028386 | A1 * | 2/2003 | Zinser, Jr. | G10L 19/173 704/500 |
| 2004/0002856 | A1 * | 1/2004 | Bhaskar | G10L 19/097 704/219 |
| 2006/0277038 | A1 * | 12/2006 | Vos | G10L 19/0208 704/219 |
| 2007/0094019 | A1 | 4/2007 | Nurminen | |
| 2007/0223577 | A1 * | 9/2007 | Ehara | G10L 19/07 375/240.03 |
| 2008/0027711 | A1 * | 1/2008 | Rajendran | G10L 19/167 704/201 |
| 2008/0126904 | A1 | 5/2008 | Sung et al. | |
| 2008/0249768 | A1 * | 10/2008 | Ertan | G10L 19/005 704/219 |
| 2008/0294429 | A1 * | 11/2008 | Su | G10L 19/09 704/222 |
| 2010/0114567 | A1 | 5/2010 | Bruhn | |
| 2010/0174532 | A1 | 7/2010 | Vos et al. | |
| 2011/0099018 | A1 * | 4/2011 | Neuendorf | G10L 21/038 704/500 |
| 2012/0095756 | A1 | 4/2012 | Sung et al. | |
| 2012/0271629 | A1 | 10/2012 | Sung et al. | |
| 2013/0226595 | A1 * | 8/2013 | Liu | G10L 21/038 704/500 |
| 2014/0236588 | A1 * | 8/2014 | Subasingha | G10L 19/07 704/219 |
| 2017/0076732 | A1 | 3/2017 | Liu et al. | |

FOREIGN PATENT DOCUMENTS

| | | | |
|---|---|---|---|
| CN | 1677491 | A | 10/2005 |
| CN | 1815552 | A | 8/2006 |
| CN | 101114450 | A | 1/2008 |
| CN | 102664003 | A | 9/2012 |
| CN | 103262161 | A | 8/2013 |
| GB | 2466670 | A | 7/2010 |
| JP | H1083200 | A | 3/1998 |
| JP | 2007212637 | A | 8/2007 |
| JP | 2010520512 | A | 6/2010 |
| KR | 101888030 | B1 | 8/2018 |
| KR | 101990538 | B1 | 6/2019 |

OTHER PUBLICATIONS

Machine Translation and Abstract of Chinese Publication No. CN1815552, Aug. 9, 2006, 6 pages.

"Digital cellular telecommunications system (Phase 2+); Universal Mobile Telecommunications System (UMTS); LTE; Mandatory Speech Codec speech processing functions; Adaptive Multi-Rate (AMR) speech codec; Error concealment of lost frames (3GPP TS 26.091 version 11.0.0 Release 11)," ETSI TS 126 091 V11.0.0, Oct. 2012, 15 pages.

Erzin, E., "Interframe Differential Coding of Line Spectrum Frequencies,", IEEE Transactions on Speech and Audio Processing, vol. 3, No. 2, Apr. 1994, pp. 350-352.

Marca, J., "An LSF Quantizer for the North-American Half-Rate Speech Coder," XP000466781, IEEE Transactions on Vehicular Technology, Aug. 1994, pp. 413-419.

"Low Bit-rate Quantization of LSP Parameters Using Two-Dimensional Differential Coding," XP010058707, Mar. 23, 1992, 4 pages.

Foreign Communication From a Counterpart Application, European Application No. 15811087.4, Extended European Search Report dated Feb. 2, 2017, 5 pages.

Foreign Communication From a Counterpart Application, PCT Application No. PCT/CN2015/074850, English Translation of International Search Report dated Jun. 19, 2015, 2 pages.

Foreign Communication From a Counterpart Application, PCT Application No. PCT/CN2015/074850, English Translation of Written Opinion dated Jun. 19, 2015, 6 pages.

Machine Translation and Abstract of Japanese Publication No. JP2007212637, Aug. 23, 2007, 15 pages.

Machine Translation and Abstract of Japanese Publication No. JPH1083200, Mar. 31, 1998, 27 pages.

Foreign Communication From a Counterpart Application, Japanese Application No. 2017-519760, Japanese Office Action dated Feb. 20, 2018, 2 pages.

Foreign Communication From a Counterpart Application, Japanese Application No. 2017-519760, English Translation of Japanese Office Action dated Feb. 20, 2018, 3 pages.

Machine Translation and Abstract of Chinese Publication No. CN1677491, Oct. 5, 2005, 38 pages.

Machine Translation and Abstract of Chinese Publication No. CN101114450, Jan. 30, 2008, 46 pages.

Machine Translation and Abstract of Chinese Publication No. CN102664003, Sep. 12, 2012, 13 pages.

Wang, T., et al., "Verification of MPEG—2 /4 AAC Audio Encoder Module," Computer Technology and Development, vol. 22, No. 7, Jul. 2012, 4 pages, with English abstract.

Foreign Communication From a Counterpart Application, Chinese Application No. 201610984423.0, Chinese Search Report dated Feb. 21, 2019, 3 pages.

Foreign Communication From a Counterpart Application, Chinese Application No. 201610984423.0, Chinese Office Action dated Mar. 1, 2019, 3 pages.

Foreign Communication From a Counterpart Application, Korean Application No. 10-2019-7016886, Korean Office Action dated Aug. 5, 2019, 4 pages.

Foreign Communication From a Counterpart Application, Korean Application No. 10-2019-7016886, English Translation of Korean Office Action dated Aug. 5, 2019, 2 pages.

* cited by examiner

AUDIO CODING METHOD AND APPARATUS

CROSS-REFERENCE TO RELATED APPLICATIONS

This application is a continuation of U.S. patent application Ser. No. 15/362,443, filed on Nov. 28, 2016, which is a continuation of International Application No. PCT/CN2015/074850, filed on Mar. 23, 2015, which claims priority to Chinese Patent Application No. 201410426046.X, filed on Aug. 26, 2014, and Chinese Patent Application No. 201410299590.2, filed on Jun. 27, 2014. All of the aforementioned patent applications are hereby incorporated by reference in their entireties.

TECHNICAL FIELD

The present application relates to the communications field, and in particular, to an audio coding method and apparatus.

BACKGROUND

With constant development of technologies, users have an increasingly higher requirement on audio quality of an electronic device. A main method for improving the audio quality is to improve a bandwidth of audio. If the electronic device codes the audio in a conventional coding manner to increase the bandwidth of the audio, a bit rate of coded information of the audio greatly increases. Therefore, when the coded information of the audio is transmitted between two electronic devices, a relatively wide network transmission bandwidth is occupied. Therefore, an issue to be addressed is to code audio having a wider bandwidth while a bit rate of coded information of the audio remains unchanged or the bit rate slightly changes. For this issue, a proposed solution is to use a bandwidth extension technology. The bandwidth extension technology is divided into a time domain bandwidth extension technology and a frequency domain bandwidth extension technology. The present disclosure relates to the time domain bandwidth extension technology.

In the time domain bandwidth extension technology, a linear predictive parameter, such as a linear predictive coding (LPC) coefficient, a linear spectral pair (LSP) coefficient, an immittance spectral pair (ISP) coefficient, or a linear spectral frequency (LSF) coefficient, of each audio frame in audio is calculated generally by using a linear predictive algorithm. When coding transmission is performed on the audio, the audio is coded according to the linear predictive parameter of each audio frame in the audio. However, in a case in which a codec error precision requirement is relatively high, this coding manner causes discontinuity of a spectrum between audio frames.

SUMMARY

Embodiments of the present disclosure provide an audio coding method and apparatus. Audio having a wider bandwidth can be coded while a bit rate remains unchanged or a bit rate slightly changes, and a spectrum between audio frames is steadier.

According to a first aspect, an embodiment of the present disclosure provides an audio coding method, including, for each audio frame, when a signal characteristic of the audio frame and a signal characteristic of a previous audio frame meet a preset modification condition, determining a first modification weight according to LSF differences of the audio frame and LSF differences of the previous audio frame, or when the signal characteristic of the audio frame and the signal characteristic of the previous audio frame do not meet the preset modification condition, determining a second modification weight, where the preset modification condition is used to determine that the signal characteristic of the audio frame is similar to the signal characteristic of the previous audio frame, modifying a linear predictive parameter of the audio frame according to the determined first modification weight or the determined second modification weight, and coding the audio frame according to a modified linear predictive parameter of the audio frame.

With reference to the first aspect, in a first possible implementation manner of the first aspect, determining a first modification weight according to LSF differences of the audio frame and LSF differences of the previous audio frame includes determining the first modification weight according to the LSF differences of the audio frame and the LSF differences of the previous audio frame by using the following formula:

$$w[i] = \begin{cases} lsf\_new\_diff[i]/lsf\_old\_diff[i], & lsf\_new\_diff[i] < lsf\_old\_diff[i] \\ lsf\_old\_diff[i]/lsf\_new\_diff[i], & lsf\_new\_diff[i] \geq lsf\_old\_diff[i] \end{cases},$$

where w[i] is the first modification weight, lsf_new_diff[i] is the LSF differences of the audio frame, lsf_old_diff[i] is the LSF differences of the previous audio frame, i is an order of the LSF differences, a value of i ranges from 0 to M−1, and M is an order of the linear predictive parameter.

With reference to the first aspect or the first possible implementation manner of the first aspect, in a second possible implementation manner of the first aspect, determining a second modification weight includes determining the second modification weight as a preset modification weight value, where the preset modification weight value is greater than 0, and is less than or equal to 1.

With reference to the first aspect, the first possible implementation manner of the first aspect, or the second possible implementation manner of the first aspect, in a third possible implementation manner of the first aspect, modifying a linear predictive parameter of the audio frame according to the determined first modification weight includes modifying the linear predictive parameter of the audio frame according to the first modification weight by using the following formula: L[i]=(1−w[i])*L_old[i]+w[i]*L_new[i], where w[i] is the first modification weight, L[i] is the modified linear predictive parameter of the audio frame, L_new[i] is the linear predictive parameter of the audio frame, L_old[i] is a linear predictive parameter of the previous audio frame, i is an order of the linear predictive parameter, the value of i ranges from 0 to M−1, and M is the order of the linear predictive parameter.

With reference to the first aspect, the first possible implementation manner of the first aspect, the second possible implementation manner of the first aspect, or the third possible implementation manner of the first aspect, in a fourth possible implementation manner of the first aspect, modifying a linear predictive parameter of the audio frame according to the determined second modification weight includes modifying the linear predictive parameter of the audio frame according to the second modification weight by using the following formula: L[i]=(1-y)*L_old[i]+y*L_new[i], where y is the second modification weight, L[i] is the modified linear predictive parameter of the audio frame, L_new[i] is the linear predictive parameter of the audio frame, L_old[i] is the linear predictive parameter of the previous audio frame, i is the order of the linear predictive parameter, the value of i ranges from 0 to M−1, and M is the order of the linear predictive parameter.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner of the first aspect, a signal characteristic of the audio frame and a signal characteristic of a previous audio frame meet a preset modification condition includes the audio frame is not a transition frame, where the transition frame includes a transition frame from a non-fricative to a fricative or a transition frame from a fricative to a non-fricative, and a signal characteristic of the audio frame and a signal characteristic of a previous audio frame do not meet a preset modification condition includes the audio frame is a transition frame.

With reference to the fifth possible implementation manner of the first aspect, in a sixth possible implementation manner of the first aspect, the audio frame is a transition frame from a fricative to a non-fricative includes a spectrum tilt frequency of the previous audio frame is greater than a first spectrum tilt frequency threshold, and a coding type of the audio frame is transient, and the audio frame is not a transition frame from a fricative to a non-fricative includes the spectrum tilt frequency of the previous audio frame is not greater than the first spectrum tilt frequency threshold, and/or the coding type the audio frame is not transient.

With reference to the fifth possible implementation manner of the first aspect, in a seventh possible implementation manner of the first aspect, the audio frame is a transition frame from a fricative to a non-fricative includes a spectrum tilt frequency of the previous audio frame is greater than a first spectrum tilt frequency threshold, and a spectrum tilt frequency of the audio frame is less than a second spectrum tilt frequency threshold, and the audio frame is not a transition frame from a fricative to a non-fricative includes the spectrum tilt frequency of the previous audio frame is not greater than the first spectrum tilt frequency threshold, and/or the spectrum tilt frequency of the audio frame is not less than the second spectrum tilt frequency threshold.

With reference to the fifth possible implementation manner of the first aspect, in an eighth possible implementation manner of the first aspect, the audio frame is a transition frame from a non-fricative to a fricative includes a spectrum tilt frequency of the previous audio frame is less than a third spectrum tilt frequency threshold, a coding type of the previous audio frame is one of the four types, voiced, generic, transient, and audio, and a spectrum tilt frequency of the audio frame is greater than a fourth spectrum tilt frequency threshold, and the audio frame is not a transition frame from a non-fricative to a fricative includes the spectrum tilt frequency of the previous audio frame is not less than the third spectrum tilt frequency threshold, and/or the coding type of the previous audio frame is not one of the four types, voiced, generic, transient, and audio, and/or the spectrum tilt frequency of the audio frame is not greater than the fourth spectrum tilt frequency threshold.

With reference to the fifth possible implementation manner of the first aspect, in a ninth possible implementation manner of the first aspect, the audio frame is a transition frame from a fricative to a non-fricative includes a spectrum tilt frequency of the previous audio frame is greater than a first spectrum tilt frequency threshold and a coding type of the audio frame is transient.

With reference to the fifth possible implementation manner of the first aspect, in a tenth possible implementation manner of the first aspect, the audio frame is a transition frame from a fricative to a non-fricative includes a spectrum tilt frequency of the previous audio frame is greater than a first spectrum tilt frequency threshold and a spectrum tilt frequency of the audio frame is less than a second spectrum tilt frequency threshold.

With reference to the fifth possible implementation manner of the first aspect, in an eleventh possible implementation manner of the first aspect, the audio frame is a transition frame from a non-fricative to a fricative includes a spectrum tilt frequency of the previous audio frame is less than a third spectrum tilt frequency threshold, a coding type of the previous audio frame is one of four types, voiced, generic, transient, and audio, and a spectrum tilt frequency of the audio frame is greater than a fourth spectrum tilt frequency threshold.

According to a second aspect, an embodiment of the present disclosure provides an audio coding apparatus, including a determining unit, a modification unit, and a coding unit, where the determining unit is configured to, for each audio frame, when a signal characteristic of the audio frame and a signal characteristic of a previous audio frame meet a preset modification condition, determine a first modification weight according to LSF differences of the audio frame and LSF differences of the previous audio frame, or when the signal characteristic of the audio frame and the signal characteristic of the previous audio frame do not meet the preset modification condition, determine a second modification weight, where the preset modification condition is used to determine that the signal characteristic of the audio frame is similar to the signal characteristic of the previous audio frame, the modification unit is configured to modify a linear predictive parameter of the audio frame according to the first modification weight or the second modification weight determined by the determining unit, and the coding unit is configured to code the audio frame according to a modified linear predictive parameter of the audio frame, where the modified linear predictive parameter is obtained after modification by the modification unit.

With reference to the second aspect, in a first possible implementation manner of the second aspect, the determining unit is configured to determine the first modification weight according to the LSF differences of the audio frame and the LSF differences of the previous audio frame by using the following formula:

$$w[i] = \begin{cases} lsf\_new\_diff[i]/lsf\_old\_diff[i], & lsf\_new\_diff[i] < lsf\_old\_diff[i] \\ lsf\_old\_diff[i]/lsf\_new\_diff[i], & lsf\_new\_diff[i] \geq lsf\_old\_diff[i] \end{cases},$$

where w[i] is the first modification weight, lsf_new_diff[i] is the LSF differences of the audio frame, lsf_old_diff[i] is the LSF differences of the previous audio frame, i is an order of the LSF differences, a value of i ranges from 0 to M−1, and M is an order of the linear predictive parameter.

With reference to the second aspect or the first possible implementation manner of the second aspect, in a second possible implementation manner of the second aspect, the determining unit is configured to determine the second modification weight as a preset modification weight value, where the preset modification weight value is greater than 0, and is less than or equal to 1.

With reference to the second aspect, the first possible implementation manner of the second aspect, or the second possible implementation manner of the second aspect, in a third possible implementation manner of the second aspect, the modification unit is configured to modify the linear predictive parameter of the audio frame according to the first modification weight by using the following formula: L[i]=(1-w[i])*L_old[i]+w[i]*L_new[i], where w[i] is the first modification weight, L[i] is the modified linear predictive parameter of the audio frame, L_new[i] is the linear predictive parameter of the audio frame, L_old[i] is a linear predictive parameter of the previous audio frame, i is an order of the linear predictive parameter, the value of i ranges from 0 to M−1, and M is the order of the linear predictive parameter.

With reference to the second aspect, the first possible implementation manner of the second aspect, the second possible implementation manner of the second aspect, or the third possible implementation manner of the second aspect, in a fourth possible implementation manner of the second aspect, the modification unit is configured to modify the linear predictive parameter of the audio frame according to the second modification weight by using the following formula: L[i]=(1-y)*L_old[i]+y*L_new[i], where y is the second modification weight, L[i] is the modified linear predictive parameter of the audio frame, L_new[i] is the linear predictive parameter of the audio frame, L_old[i] is the linear predictive parameter of the previous audio frame, i is the order of the linear predictive parameter, the value of i ranges from 0 to M−1, and M is the order of the linear predictive parameter.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner of the second aspect, the determining unit is configured to, for each audio frame in audio, when the audio frame is not a transition frame, determine the first modification weight according to the LSF differences of the audio frame and the LSF differences of the previous audio frame, and when the audio frame is a transition frame, determine the second modification weight, where the transition frame includes a transition frame from a non-fricative to a fricative, or a transition frame from a fricative to a non-fricative.

With reference to the fifth possible implementation manner of the second aspect, in a sixth possible implementation manner of the second aspect, the determining unit is configured to, for each audio frame in the audio, when a spectrum tilt frequency of the previous audio frame is not greater than a first spectrum tilt frequency threshold and/or a coding type of the audio frame is not transient, determine the first modification weight according to the LSF differences of the audio frame and the LSF differences of the previous audio frame, and when the spectrum tilt frequency of the previous audio frame is greater than the first spectrum tilt frequency threshold and the coding type of the audio frame is transient, determine the second modification weight.

With reference to the fifth possible implementation manner of the second aspect, in a seventh possible implementation manner of the second aspect, the determining unit is configured to, for each audio frame in the audio, when a spectrum tilt frequency of the previous audio frame is not greater than a first spectrum tilt frequency threshold and/or a spectrum tilt frequency of the audio frame is not less than a second spectrum tilt frequency threshold, determine the first modification weight according to the LSF differences of the audio frame and the LSF differences of the previous audio frame, and when the spectrum tilt frequency of the previous audio frame is greater than the first spectrum tilt frequency threshold and the spectrum tilt frequency of the audio frame is less than the second spectrum tilt frequency threshold, determine the second modification weight.

With reference to the fifth possible implementation manner of the second aspect, in an eighth possible implementation manner of the second aspect, the determining unit is configured to, for each audio frame in the audio, when a spectrum tilt frequency of the previous audio frame is not less than a third spectrum tilt frequency threshold, and/or a coding type of the previous audio frame is not one of four types, voiced, generic, transient, and audio, and/or a spectrum tilt of the audio frame is not greater than a fourth spectrum tilt threshold, determine the first modification weight according to the LSF differences of the audio frame and the LSF differences of the previous audio frame, and when the spectrum tilt frequency of the previous audio frame is less than the third spectrum tilt frequency threshold, the coding type of the previous audio frame is one of the four types, voiced, generic, transient, and audio, and the spectrum tilt frequency of the audio frame is greater than the fourth spectrum tilt frequency threshold, determine the second modification weight.

In the embodiments of the present disclosure, for each audio frame in audio, when it is determined that a signal characteristic of the audio frame and a signal characteristic of a previous audio frame meet a preset modification condition, a first modification weight is determined according to LSF differences of the audio frame and LSF differences of the previous audio frame, or when it is determined that the signal characteristic of the audio frame and the signal characteristic of a previous audio frame do not meet the preset modification condition, a second modification weight is determined, where the preset modification condition is used to determine that the signal characteristic of the audio frame is similar to the signal characteristic of the previous audio frame. A linear predictive parameter of the audio frame is modified according to the determined first modification weight or the determined second modification weight and the audio frame is coded according to a modified linear predictive parameter of the audio frame. In this way, different modification weights are determined according to whether the signal characteristic of the audio frame is similar to the signal characteristic of the previous audio frame and the linear predictive parameter of the audio frame is modified so that a spectrum between audio frames is steadier. Moreover, the audio frame is coded according to the modified linear predictive parameter of the audio frame so that inter-frame continuity of a spectrum recovered by decoding is enhanced while a bit rate remains unchanged, and therefore, the spectrum recovered by decoding is closer to an original spectrum and coding performance is improved.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1A:
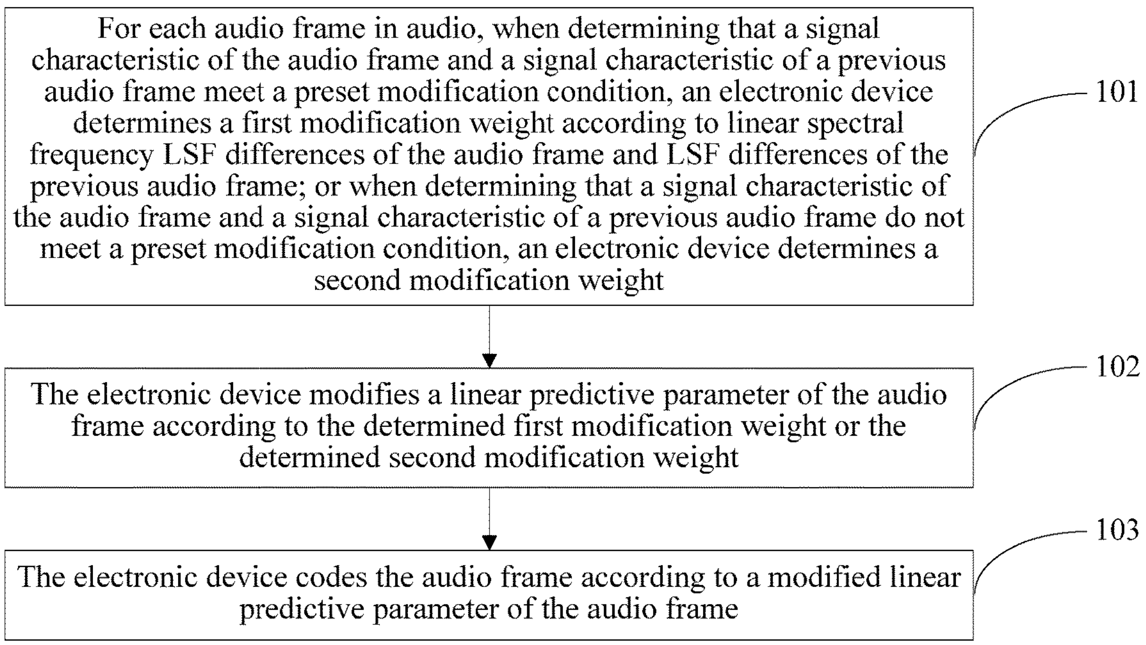
FIG. 1A is a schematic flowchart of an audio coding method according to an embodiment of the present disclosure.

Referring to FIG. 1A, a flowchart of an audio coding method according to an embodiment of the present disclosure is shown and includes the following steps.

Step 101: For each audio frame in audio, when a signal characteristic of the audio frame and a signal characteristic of a previous audio frame meet a preset modification condition, an electronic device determines a first modification weight according to LSF differences of the audio frame and LSF differences of the previous audio frame. When the signal characteristic of the audio frame and the signal characteristic of the previous audio frame do not meet the preset modification condition, the electronic device determines a second modification weight, where the preset modification condition is used to determine that the signal characteristic of the audio frame is similar to the signal characteristic of the previous audio frame.

Step 102: The electronic device modifies a linear predictive parameter of the audio frame according to the determined first modification weight or the determined second modification weight.

The linear predictive parameter may include an LPC, an LSP, an ISP, an LSF, or the like.

Step 103: The electronic device codes the audio frame according to a modified linear predictive parameter of the audio frame.

In this embodiment, for each audio frame in audio, when the signal characteristic of the audio frame and the signal characteristic of the previous audio frame meet the preset modification condition, the electronic device determines the first modification weight according to LSF differences of the audio frame and LSF differences of the previous audio frame. When the signal characteristic of the audio frame and the signal characteristic of the previous audio frame do not meet the preset modification condition, the electronic device determines a second modification weight. The electronic device modifies a linear predictive parameter of the audio frame according to the determined first modification weight or the determined second modification weight and codes the audio frame according to a modified linear predictive parameter of the audio frame. In this way, different modification weights are determined according to whether the signal characteristic of the audio frame is similar to the signal characteristic of the previous audio frame and the linear predictive parameter of the audio frame is modified so that a spectrum between audio frames is steadier. In addition, different modification weights are determined according to whether the signal characteristic of the audio frame is similar to the signal characteristic of the previous audio frame and a second modification weight that is determined when the signal characteristics are not similar may be as close to 1 as possible so that an original spectrum feature of the audio frame is kept as much as possible when the signal characteristic of the audio frame is not similar to the signal characteristic of the previous audio frame, and therefore auditory quality of the audio obtained after coded information of the audio is decoded is better.

Specific implementation of how the electronic device determines whether the signal characteristic of the audio frame and the signal characteristic of the previous audio frame meet the preset modification condition in step 101 is related to specific implementation of the modification condition. A description is provided below by using an example.

In a possible implementation manner, the modification condition may include, if the audio frame is not a transition frame, determining, by the electronic device, that the signal characteristic of the audio frame and the signal characteristic of the previous audio frame meet the preset modification condition may include the audio frame is not a transition frame, where the transition frame includes a transition frame from a non-fricative to a fricative or a transition frame from a fricative to a non-fricative. Determining, by an electronic device, that the signal characteristic of the audio frame and the signal characteristic of the previous audio frame do not meet the preset modification condition may include the audio frame is a transition frame.

In a possible implementation manner, determining whether the audio frame is the transition frame from a fricative to a non-fricative may be implemented by determining whether a spectrum tilt frequency of the previous audio frame is greater than a first spectrum tilt frequency threshold, and whether a coding type of the audio frame is transient. Determining that the audio frame is a transition frame from a fricative to a non-fricative may include determining that the spectrum tilt frequency of the previous audio frame is greater than the first spectrum tilt frequency threshold and the coding type of the audio frame is transient. Determining that the audio frame is not a transition frame from a fricative to a non-fricative may include determining that the spectrum tilt frequency of the previous audio frame is not greater than the first spectrum tilt frequency threshold and/or the coding type of the audio frame is not transient.

In another possible implementation manner, determining whether the audio frame is the transition frame from a fricative to a non-fricative may be implemented by determining whether a spectrum tilt frequency of the previous audio frame is greater than a first frequency threshold and determining whether a spectrum tilt frequency of the audio frame is less than a second frequency threshold. Determining that the audio frame is the transition frame from a fricative to a non-fricative may include determining that the spectrum tilt frequency of the previous audio frame is greater than the first spectrum tilt frequency threshold and the spectrum tilt frequency of the audio frame is less than the second spectrum tilt frequency threshold. Determining that the audio frame is not the transition frame from a fricative to a non-fricative may include determining that the spectrum tilt frequency of the previous audio frame is not greater than the first spectrum tilt frequency threshold and/or the spectrum tilt frequency of the audio frame is not less than the second spectrum tilt frequency threshold. Specific values of the first spectrum tilt frequency threshold and the second spectrum tilt frequency threshold are not limited in this embodiment of the present disclosure, and a relationship between the values of the first spectrum tilt frequency threshold and the second spectrum tilt frequency threshold is not limited. Optionally, in an embodiment of the present disclosure, the value of the first spectrum tilt frequency threshold may be 5.0. In another embodiment of the present disclosure, the value of the second spectrum tilt frequency threshold may be 1.0.

In a possible implementation manner, determining whether the audio frame is the transition frame from a non-fricative to a fricative may be implemented by determining whether a spectrum tilt frequency of the previous audio frame is less than a third frequency threshold, determining whether a coding type of the previous audio frame is one of four types, voiced, generic, transient, and/or audio, and determining whether a spectrum tilt frequency of the audio frame is greater than a fourth frequency threshold. Determining that the audio frame is a transition frame from a non-fricative to a fricative may include determining that the spectrum tilt frequency of the previous audio frame is less than the third spectrum tilt frequency threshold, the coding type of the previous audio frame is one of the four types, voiced, generic, transient, and/or audio, and the spectrum tilt of the audio frame is greater than the fourth spectrum tilt threshold. Determining that the audio frame is not the transition frame from a non-fricative to a fricative may include determining that the spectrum tilt frequency of the previous audio frame is not less than the third spectrum tilt frequency threshold, and/or the coding type of the previous audio frame is not one of the four types, voiced, generic, transient, and/or audio, and/or the spectrum tilt frequency of the audio frame is not greater than the fourth spectrum tilt frequency threshold. Specific values of the third spectrum tilt frequency threshold and the fourth spectrum tilt frequency threshold are not limited in this embodiment of the present disclosure, and a relationship between the values of the third spectrum tilt frequency threshold and the fourth spectrum tilt frequency threshold is not limited. In an embodiment of the present disclosure, the value of the third spectrum tilt frequency threshold may be 3.0. In another embodiment of the present disclosure, the value of the fourth spectrum tilt frequency threshold may be 5.0.

In step 101, the determining, by an electronic device, a first modification weight according to LSF differences of the audio frame and LSF differences of the previous audio frame may include determining, by the electronic device, the first modification weight according to the LSF differences of the audio frame and the LSF differences of the previous audio frame by using the following formula:

$$w[i] = \begin{cases} \dfrac{\text{lsf\_new\_diff}[i]}{\text{lsf\_old\_diff}[i]}, & \text{lsf\_new\_diff}[i] < \text{lsf\_old\_diff}[i] \\ \dfrac{\text{lsf\_old\_diff}[i]}{\text{lsf\_new\_diff}[i]}, & \text{lsf\_new\_diff}[i] \geq \text{lsf\_old\_diff}[i] \end{cases} \quad (1)$$

where w[i] is the first modification weight, lsf_new_diff[i] is the LSF differences of the audio frame, lsf_new_diff[i] =lsf_new[i]−lsf_new[i−1], lsf_new[i] is the $i^{th}$-order LSF parameter of the audio frame, lsf_new[i−1] is the $(i-1)^{th}$-order LSF parameter of the audio frame, lsf_old_diff[i] is the LSF differences of the previous audio frame, lsf_old_diff[i] =lsf_old[i]-lsf_old[i−1], lsf_old[i] is the $i^{th}$-order LSF parameter of the previous audio frame, lsf_old[i−1] is the $(i-1)^{th}$-order LSF parameter of the previous audio frame, i is an order of the LSF parameter and an order of the LSF differences, a value of i ranges from 0 to M−1, and M is an order of the linear predictive parameter.

A principle of the foregoing formula is as follows.

Figure 1B:
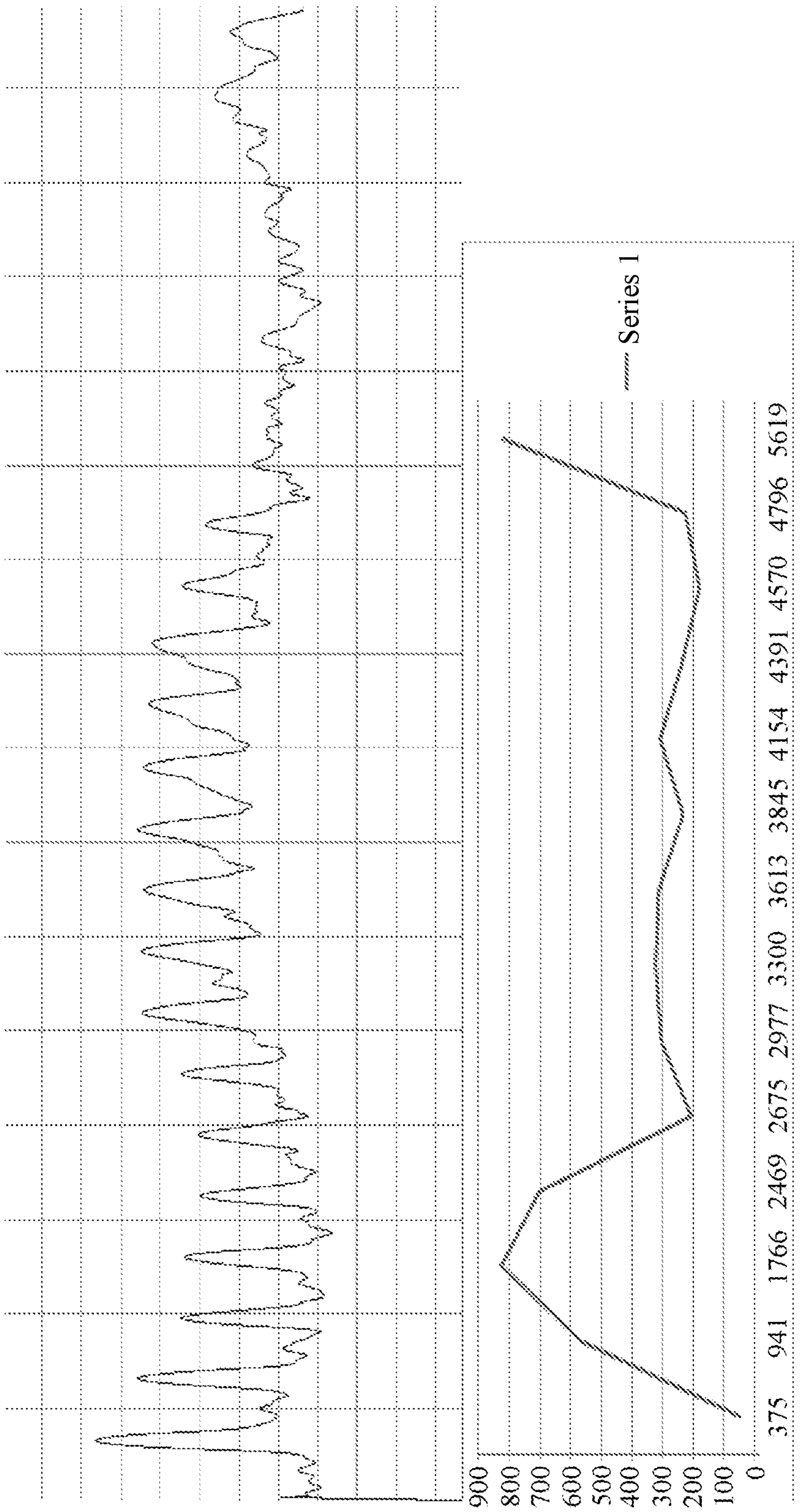
FIG. 1B is a diagram of a comparison between an actual spectrum and LSF differences according to an embodiment of the present disclosure.

Refer to FIG. 1B, which is a diagram of a comparison between an actual spectrum and LSF differences according to an embodiment of the present disclosure. As can be seen from the figure, the LSF differences lsf_new_diff[i] in the audio frame reflects a spectrum energy trend of the audio frame. Smaller lsf_new_diff[i] indicates larger spectrum energy of a corresponding frequency point.

Smaller w[i]=lsf_new_diff[i]/lsf_old_diff[i] indicates a greater spectrum energy difference between a previous frame and a current frame at a frequency point corresponding to lsf_new[i] and that spectrum energy of the audio frame is much greater than spectrum energy of a frequency point corresponding to the previous audio frame.

Smaller w[i]=lsf_old_diff[i]/lsf_new_diff[i] indicates a smaller spectrum energy difference between the previous frame and the current frame at the frequency point corresponding to lsf_new[i] and that the spectrum energy of the audio frame is much smaller than spectrum energy of the frequency point corresponding to the previous audio frame.

Therefore, to make a spectrum between the previous frame and the current frame steady, w[i] may be used as a weight of the audio frame lsf_new[i] and 1−w[i] may be used as a weight of the frequency point corresponding to the previous audio frame. Details are shown in formula 2.

In step 101, determining, by the electronic device, the second modification weight may include determining, by the electronic device, the second modification weight as a preset modification weight value, where the preset modification weight value is greater than 0 and is less than or equal to 1.

Preferably, the preset modification weight value is a value close to 1.

In step 102, modifying, by the electronic device, the linear predictive parameter of the audio frame according to the determined first modification weight may include modifying the linear predictive parameter of the audio frame according to the first modification weight by using the following formula:

$$L[i]=(1-w[i])*L\_old[i]+w[i]*L\_new[i], \quad (2)$$

where w[i] is the first modification weight, L[i] is the modified linear predictive parameter of the audio frame, L_new[i] is the linear predictive parameter of the audio frame, L_old[i] is a linear predictive parameter of the previous audio frame, i is an order of the linear predictive parameter, the value of i ranges from 0 to M−1, and M is the order of the linear predictive parameter.

In step 102, modifying, by the electronic device, the linear predictive parameter of the audio frame according to the determined second modification weight may include modifying the linear predictive parameter of the audio frame according to the second modification weight by using the following formula:

$$L[i]=(1-y)*L\_old[i]+y*L\_new[i], \quad (3)$$

where y is the second modification weight, L[i] is the modified linear predictive parameter of the audio frame, L_new[i] is the linear predictive parameter of the audio frame, L_old[i] is the linear predictive parameter of the previous audio frame, i is the order of the linear predictive parameter, the value of i ranges from 0 to M−1, and M is the order of the linear predictive parameter.

In step 103, for how the electronic device codes the audio frame according to the modified linear predictive parameter of the audio frame, refer to a related time domain bandwidth extension technology, and details are not described in the present disclosure.

Figure 2:
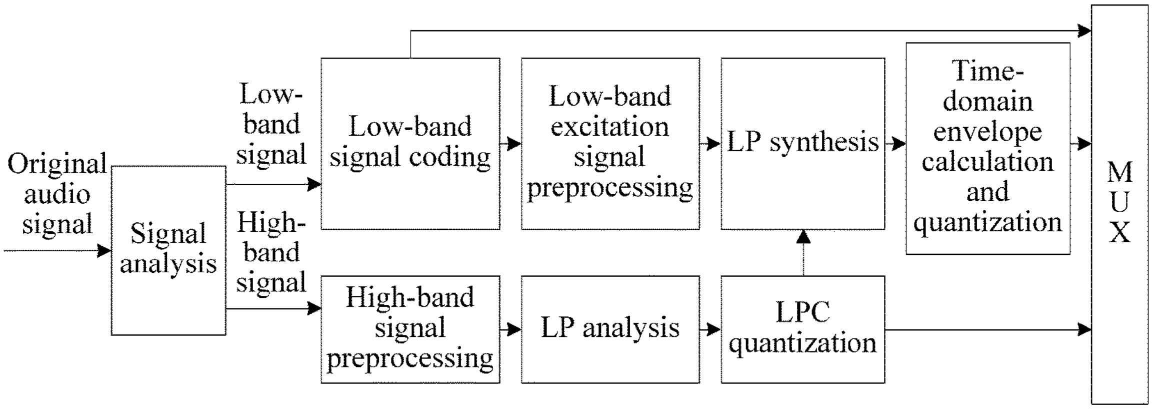
FIG. 2 is an example of an application scenario of an audio coding method according to an embodiment of the present disclosure.

The audio coding method in this embodiment of the present disclosure may be applied to a time domain bandwidth extension method shown in FIG. 2. In the time domain bandwidth extension method an original audio signal is divided into a low-band signal and a high-band signal. For the low-band signal, processing such as low-band signal coding, low-band excitation signal preprocessing, linear prediction (LP) synthesis, and time-domain envelope calculation and quantization is performed in sequence. For the high-band signal, processing such as high-band signal preprocessing, LP analysis, and LPC quantization is performed in sequence and multiplexing (MUX) is performed on the audio signal according to a result of the low-band signal coding, a result of the LPC quantization, and a result of the time-domain envelope calculation and quantization.

The LPC quantization corresponds to step 101 and step 102 in this embodiment of the present disclosure, and the MUX performed on the audio signal corresponds to step 103 in this embodiment of the present disclosure.

Figure 3:
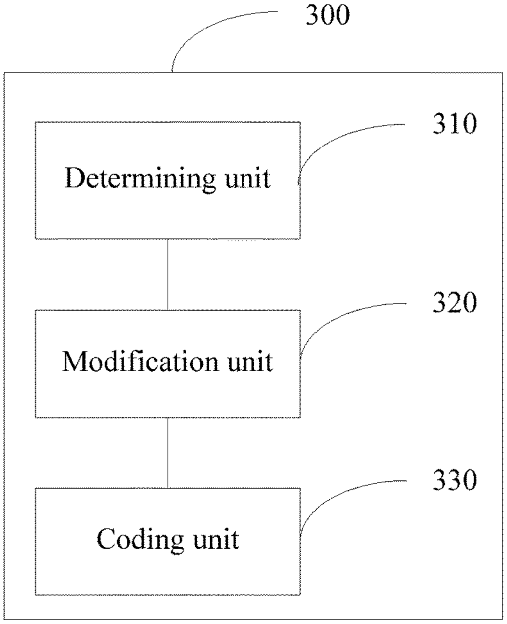
FIG. 3 is schematic structural diagram of an audio coding apparatus according to an embodiment of the present disclosure.

Refer to FIG. 3, which is a schematic structural diagram of an audio coding apparatus according to an embodiment of the present disclosure. The apparatus 300 may be disposed in an electronic device. The apparatus 300 may include a determining unit 310, a modification unit 320, and a coding unit 330.

The determining unit 310 is configured to, for each audio frame in audio, when a signal characteristic of the audio frame and a signal characteristic of a previous audio frame meet a preset modification condition, determine a first modification weight according to LSF differences of the audio frame and LSF differences of the previous audio frame. When the signal characteristic of the audio frame and the signal characteristic of the previous audio frame do not meet the preset modification condition, determine a second modification weight, where the preset modification condition is used to determine that the signal characteristic of the audio frame is similar to the signal characteristic of the previous audio frame.

The modification unit 320 is configured to modify a linear predictive parameter of the audio frame according to the first modification weight or the second modification weight determined by the determining unit 310.

The coding unit 330 is configured to code the audio frame according to a modified linear predictive parameter of the audio frame, where the modified linear predictive parameter is obtained after modification by the modification unit 320.

Optionally, the determining unit 310 may be configured to determine the first modification weight according to the LSF differences of the audio frame and the LSF differences of the previous audio frame by using the following formula, which may be substantially similar to formula 1:

$$w[i]=\begin{cases} \text{lsf\_new\_diff}[i]/\text{lsf\_old\_diff}[i], & \text{lsf\_new\_diff}[i]<\text{lsf\_old\_diff}[i] \\ \text{lsf\_old\_diff}[i]/\text{lsf\_new\_diff}[i], & \text{lsf\_new\_diff}[i]\geq\text{lsf\_old\_diff}[i] \end{cases},$$

where w[i] is the first modification weight, lsf_new_diff[i] is the LSF differences of the audio frame, lsf_old_diff[i] is the LSF differences of the previous audio frame, i is an order of the LSF differences, a value of i ranges from 0 to M−1, and M is an order of the linear predictive parameter.

Optionally, the determining unit 310 may be configured to determine the second modification weight as a preset modification weight value, where the preset modification weight value is greater than 0, and is less than or equal to 1.

Optionally, the modification unit 320 may be configured to modify the linear predictive parameter of the audio frame according to the first modification weight by using the following formula, which may be substantially similar to formula 2:

$$L[i]=(1-w[i])*L\_\text{old}[i]+w[i]*L\_\text{new}[i],$$

where w[i] is the first modification weight, L[i] is the modified linear predictive parameter of the audio frame, L_new[i] is the linear predictive parameter of the audio frame, L_old[i] is a linear predictive parameter of the previous audio frame, i is an order of the linear predictive parameter, the value of i ranges from 0 to M−1, and M is the order of the linear predictive parameter.

Optionally, the modification unit 320 may be configured to modify the linear predictive parameter of the audio frame according to the second modification weight by using the following formula, which may be substantially similar to formula 3:

$$L[i]=(1-y)*L\_\text{old}[i]+y*L\_\text{new}[i],$$

where y is the second modification weight, L[i] is the modified linear predictive parameter of the audio frame, L_new[i] is the linear predictive parameter of the audio frame, L_old[i] is the linear predictive parameter of the previous audio frame, i is the order of the linear predictive parameter, the value of i ranges from 0 to M−1, and M is the order of the linear predictive parameter.

Optionally, the determining unit 310 may be configured to, for each audio frame in the audio, when the audio frame is not a transition frame, determine the first modification weight according to the LSF differences of the audio frame and the LSF differences of the previous audio frame. When the audio frame is a transition frame, determine the second modification weight, where the transition frame includes a transition frame from a non-fricative to a fricative, or a transition frame from a fricative to a non-fricative.

Optionally, the determining unit 310 may be configured to, for each audio frame in the audio, when a spectrum tilt frequency of the previous audio frame is not greater than a first spectrum tilt frequency threshold and/or a coding type of the audio frame is not transient, determine the first modification weight according to the LSF differences of the audio frame and the LSF differences of the previous audio frame. When the spectrum tilt frequency of the previous audio frame is greater than the first spectrum tilt frequency threshold and the coding type of the audio frame is transient, determine the second modification weight.

Optionally, the determining unit 310 may be configured to, for each audio frame in the audio, when a spectrum tilt frequency of the previous audio frame is not greater than a first spectrum tilt frequency threshold and/or a spectrum tilt frequency of the audio frame is not less than a second spectrum tilt frequency threshold, determine the first modification weight according to the LSF differences of the audio frame and the LSF differences of the previous audio frame. When the spectrum tilt frequency of the previous audio frame is greater than the first spectrum tilt frequency threshold and the spectrum tilt frequency of the audio frame is less than the second spectrum tilt frequency threshold, determine the second modification weight.

Optionally, the determining unit 310 may be configured to, for each audio frame in the audio, when determining a spectrum tilt frequency of the previous audio frame is not less than a third spectrum tilt frequency threshold, and/or a coding type of the previous audio frame is not one of four types, voiced, generic, transient, and/or audio, and/or a spectrum tilt of the audio frame is not greater than a fourth spectrum tilt threshold, determine the first modification weight according to the LSF differences of the audio frame and the LSF differences of the previous audio frame. When the spectrum tilt frequency of the previous audio frame is less than the third spectrum tilt frequency threshold, the coding type of the previous audio frame is one of the four types, voiced, generic, transient, and/or audio, and the spectrum tilt frequency of the audio frame is greater than the fourth spectrum tilt frequency threshold, determine the second modification weight.

In this embodiment, for each audio frame in audio, when a signal characteristic of the audio frame and a signal characteristic of a previous audio frame meet a preset modification condition, an electronic device determines a first modification weight according to LSF differences of the audio frame and LSF differences of the previous audio frame. When a signal characteristic of the audio frame and a signal characteristic of a previous audio frame do not meet a preset modification condition, the electronic device determines a second modification weight. The electronic device modifies a linear predictive parameter of the audio frame according to the determined first modification weight or the determined second modification weight and codes the audio frame according to a modified linear predictive parameter of the audio frame. In this way, different modification weights are determined according to whether the signal characteristic of the audio frame and the signal characteristic of the previous audio frame meet the preset modification condition, and the linear predictive parameter of the audio frame is modified so that a spectrum between audio frames is steadier. Moreover, the electronic device codes the audio frame according to the modified linear predictive parameter of the audio frame, and therefore, audio having a wider bandwidth is coded while a bit rate remains unchanged or a bit rate slightly changes.

Figure 4:
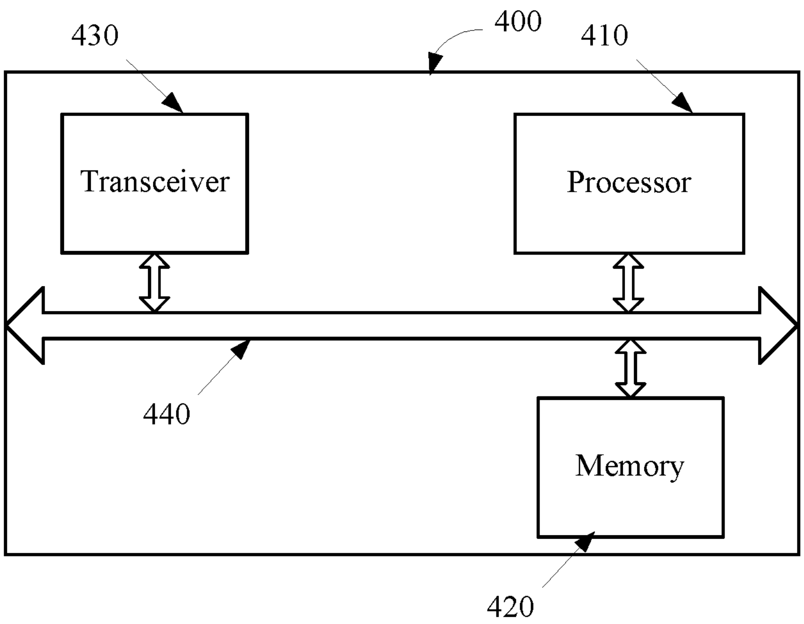
FIG. 4 is a schematic structural diagram of an electronic device according to an embodiment of the present disclosure.

Refer to FIG. 4, which is a structural diagram of a first node according to an embodiment of the present disclosure. The first node 400 includes a processor 410, a memory 420, a transceiver 430, and a bus 440.

The processor 410, the memory 420, and the transceiver 430 are connected to each other by using the bus 440, and the bus 440 may be an industry standard architecture (ISA) bus, a peripheral component interconnect (PCI) bus, an extended ISA (EISA) bus, or the like. The bus may be classified into an address bus, a data bus, a control bus, and the like. For ease of representation, the bus in FIG. 4 is represented by using only one bold line, but it does not indicate that there is only one bus or only one type of bus.

The memory 420 is configured to store a program. The program may include program code, and the program code includes a computer operation instruction. The memory 420 may include a high-speed random access memory (RAM), and may further include a non-volatile memory, such as at least one magnetic disk memory.

The transceiver 430 is configured to connect other devices, and communicate with other devices.

The processor 410 executes the program code and is configured to, for each audio frame in audio, when a signal characteristic of the audio frame and a signal characteristic of a previous audio frame meet a preset modification condition, determine a first modification weight according to LSF differences of the audio frame and LSF differences of the previous audio frame. When the signal characteristic of the audio frame and the signal characteristic of the previous audio frame do not meet the preset modification condition, determine a second modification weight, where the preset modification condition is used to determine that the signal characteristic of the audio frame is similar to the signal characteristic of the previous audio frame, modify a linear predictive parameter of the audio frame according to the determined first modification weight or the determined second modification weight, and code the audio frame according to a modified linear predictive parameter of the audio frame.

Optionally, the processor 410 may be configured to determine the first modification weight according to the LSF differences of the audio frame and the LSF differences of the previous audio frame by using the following formula, which may be substantially similar to formula 1:

$$w[i] = \begin{cases} \text{lsf\_new\_diff}[i]/\text{lsf\_old\_diff}[i], & \text{lsf\_new\_diff}[i] < \text{lsf\_old\_diff}[i] \\ \text{lsf\_old\_diff}[i]/\text{lsf\_new\_diff}[i], & \text{lsf\_new\_diff}[i] \geq \text{lsf\_old\_diff}[i] \end{cases},$$

where w[i] is the first modification weight, lsf_new_diff[i] is the LSF differences of the audio frame, lsf_old_diff[i] is the LSF differences of the previous audio frame, i is an order of the LSF differences, a value of i ranges from 0 to M−1, and M is an order of the linear predictive parameter.

Optionally, the processor 410 may be configured to determine the second modification weight as 1, or determine the second modification weight as a preset modification weight value, where the preset modification weight value is greater than 0, and is less than or equal to 1.

Optionally, the processor 410 may be configured to modify the linear predictive parameter of the audio frame according to the first modification weight by using the following formula, which may be substantially similar to formula 2:

$$L[i]=(1-w[i])*L\_\text{old}[i]+w[i]*L\_\text{new}[i],$$

where w[i] is the first modification weight, L[i] is the modified linear predictive parameter of the audio frame, L_new[i] is the linear predictive parameter of the audio frame, L_old[i] is a linear predictive parameter of the previous audio frame, i is an order of the linear predictive parameter, the value of i ranges from 0 to M−1, and M is the order of the linear predictive parameter.

Optionally, the processor 410 may be configured to modify the linear predictive parameter of the audio frame according to the second modification weight by using the following formula, which may be substantially similar to formula 3:

$$L[i]=(1-y)*L\_\text{old}[i]+y*L\_\text{new}[i],$$

where y is the second modification weight, L[i] is the modified linear predictive parameter of the audio frame, L_new[i] is the linear predictive parameter of the audio frame, L_old[i] is the linear predictive parameter of the previous audio frame, i is the order of the linear predictive parameter, the value of i ranges from 0 to M−1, and M is the order of the linear predictive parameter.

Optionally, the processor 410 may be configured to, for each audio frame in the audio, when the audio frame is not a transition frame, determine the first modification weight according to the LSF differences of the audio frame and the LSF differences of the previous audio frame. When the audio frame is a transition frame, determine the second modification weight, where the transition frame includes a transition frame from a non-fricative to a fricative, or a transition frame from a fricative to a non-fricative.

Optionally, the processor 410 may be configured to, for each audio frame in the audio, when a spectrum tilt frequency of the previous audio frame is not greater than a first spectrum tilt frequency threshold and/or a coding type of the audio frame is not transient, determine the first modification weight according to the LSF differences of the audio frame and the LSF differences of the previous audio frame. When the spectrum tilt frequency of the previous audio frame is greater than the first spectrum tilt frequency threshold and the coding type of the audio frame is transient, determine the second modification weight, or for each audio frame in the audio, when a spectrum tilt frequency of the previous audio frame is not greater than a first spectrum tilt frequency threshold and/or a spectrum tilt frequency of the audio frame is not less than a second spectrum tilt frequency threshold, determine the first modification weight according to the LSF differences of the audio frame and the LSF differences of the previous audio frame. When the spectrum tilt frequency of the previous audio frame is greater than the first spectrum tilt frequency threshold and the spectrum tilt frequency of the audio frame is less than the second spectrum tilt frequency threshold, determine the second modification weight.

Optionally, the processor 410 may be configured to, for each audio frame in the audio, when a spectrum tilt frequency of the previous audio frame is not less than a third spectrum tilt frequency threshold, and/or a coding type of the previous audio frame is not one of four types, voiced, generic, transient, and/or audio, and/or a spectrum tilt of the audio frame is not greater than a fourth spectrum tilt threshold, determine the first modification weight according to the LSF differences of the audio frame and the LSF differences of the previous audio frame. When the spectrum tilt frequency of the previous audio frame is less than the third spectrum tilt frequency threshold, the coding type of the previous audio frame is one of the four types, voiced, generic, transient, and/or audio, and the spectrum tilt frequency of the audio frame is greater than the fourth spectrum tilt frequency threshold, determine the second modification weight.

In this embodiment, for each audio frame in audio, when a signal characteristic of the audio frame and a signal characteristic of a previous audio frame meet a preset modification condition, an electronic device determines a first modification weight according to LSF differences of the audio frame and LSF differences of the previous audio frame. When the signal characteristic of the audio frame and the signal characteristic of the previous audio frame do not meet the preset modification condition, the electronic device determines a second modification weight. The electronic device modifies a linear predictive parameter of the audio frame according to the determined first modification weight or the determined second modification weight and codes the audio frame according to a modified linear predictive parameter of the audio frame. In this way, different modification weights are determined according to whether the signal characteristic of the audio frame and the signal characteristic of the previous audio frame meet the preset modification condition, and the linear predictive parameter of the audio frame is modified so that a spectrum between audio frames is steadier. Moreover, the electronic device codes the audio frame according to the modified linear predictive parameter of the audio frame, and therefore, audio having a wider bandwidth is coded while a bit rate remains unchanged or a bit rate slightly changes.

A person skilled in the art may clearly understand that, the technologies in the embodiments of the present disclosure may be implemented by software in addition to a necessary general hardware platform. Based on such an understanding, the technical solutions of the present disclosure essentially or the part contributing to the prior art may be implemented in a form of a software product. The software product is stored in a storage medium, such as a read only memory (ROM)/RAM, a hard disk, or an optical disc, and includes several instructions for instructing a computer device (which may be a personal computer, a server, or a network device) to perform the methods described in the embodiments or some parts of the embodiments of the present disclosure.

In this specification, the embodiments are described in a progressive manner. Reference may be made to each other for a same or similar part of the embodiments. Each embodiment focuses on a difference from other embodiments. Especially, the system embodiment is basically similar to the method embodiments, and therefore is briefly described. For a relevant part, reference may be made to the description in the part of the method embodiments.

The foregoing descriptions are implementation manners of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. An audio coding method comprising:

obtaining an audio signal;

performing linear prediction analysis on the audio signal to obtain a linear predictive parameter of a current frame of the audio signal;

determining a first modification weight according to linear spectral frequency (LSF) differences of the current frame of the audio signal and LSF differences of a previous frame of the current frame of the audio signal when a signal characteristic of the current frame meets a preset modification condition;

modifying the linear predictive parameter of the current frame according to the determined first modification weight; and coding the current frame according to the modified linear predictive parameter of the current frame.

2. The method of claim 1, wherein determining the first modification weight according to the LSF differences of the current frame of the audio signal and the LSF differences of the previous frame of the current frame of the audio signal is determined according to the formula:

$$w[i] = \begin{cases} \text{lsf\_new\_diff}[i]/\text{lsf\_old\_diff}[i], & \text{lsf\_new\_diff}[i] < \text{lsf\_old\_diff}[i] \\ \text{lsf\_old\_diff}[i]/\text{lsf\_new\_diff}[i], & \text{lsf\_new\_diff}[i] \ge \text{lsf\_old\_diff}[i] \end{cases},$$

wherein w[i] is the first modification weight, wherein lsf_new_diff[i] is the LSF differences of the current frame, wherein lsf_old_diff[i] is the LSF differences of the previous frame, and wherein i is an integer.

3. The method of claim 2, wherein the value of i ranges from 0 to 9.

4. The method of claim 1, wherein modifying the linear predictive parameter of the current frame according to the determined first modification weight comprises modifying the linear predictive parameter of the current frame according to the formula:

$$L[i]=(1-w[i])*L\_old[i]+w[i]*L\_new[i],$$

wherein L[i] is the modified linear predictive parameter of the current frame,
wherein w[i] is the first modification weight,
wherein L_new[i] is the linear predictive parameter of the current frame,
wherein L_old[i] is a linear predictive parameter of a previous frame of the current frame, and
wherein i is an integer.

5. The method of claim 4, wherein the value of i ranges from 0 to 9.

6. The method of claim 1, wherein the signal characteristic of the current frame meets the preset modification condition when the current frame is not a transition frame.

7. The method of claim 6, wherein a frame is a transition frame when a tilt of a previous frame of the current frame is greater than a tilt threshold value and a coder type of the frame is transient.

8. The method of claim 6, wherein a frame is a transition frame when a tilt of the previous frame of the current frame is greater than a first tilt threshold value and a tilt of the current frame is less than a second tilt threshold value.

9. The method of claim 6, wherein a frame is a transition frame when a tilt of a previous frame of the current frame is less than a first tilt threshold value and a coder type of the previous frame is one of four types of VOICED, GENERIC, TRANSITION or AUDIO, and wherein a tilt of the current frame is greater than a second tilt threshold value.

10. The method of claim 1, wherein the first modification weight is determined according to a ratio between one of the LSF differences of the current frame of the audio signal and one of the LSF differences of the previous frame of the current frame of the audio signal.

11. An audio coding apparatus comprising:
a memory storing instructions; and
a processor coupled to the memory and configured to execute the instructions to:
obtain an audio signal;
perform linear prediction analysis on the audio signal to obtain a linear predictive parameter of a current frame of the audio signal;
determine a first modification weight according to linear spectral frequency (LSF) differences of the current frame of the audio signal and the LSF differences of a previous frame of the current frame of the audio signal when a signal characteristic of the current frame meets a preset modification condition;
modify the linear predictive parameter of the current frame according to the determined first modification weight; and
code the current frame according to the modified linear predictive parameter of the current frame.

12. The apparatus of claim 11, wherein determining the first modification weight according to the LSF differences of the current frame of the audio signal and the LSF differences of the previous frame of the current frame of the audio signal is determined according to the formula:

$$w[i]=\begin{cases} lsf\_new\_diff[i]/lsf\_old\_diff[i], & lsf\_new\_diff[i] < lsf\_old\_diff[i] \\ lsf\_old\_diff[i]/lsf\_new\_diff[i], & lsf\_new\_diff[i] \geq lsf\_old\_diff[i] \end{cases},$$

wherein w[i] is the first modification weight, wherein lsf_new_diff[i] is the LSF differences of the current frame, wherein lsf_old_diff[i] is the LSF differences of the previous frame, and wherein i is an integer.

13. The apparatus of claim 12, wherein the value of i ranges from 0 to 9.

14. The apparatus of claim 11, wherein modifying the linear predictive parameter of the current frame according to the determined first modification weight comprises modifying the linear predictive parameter of the current frame according to the formula:

$$L[i]=(1-w[i])*L\_old[i]+w[i]*L\_new[i]$$

wherein L[i] is the modified linear predictive parameter of the current frame,
wherein w[i] is the first modification weight,
wherein L_new[i] is the linear predictive parameter of the current frame,
wherein L_old[i] is a linear predictive parameter of a previous frame of the current frame, and
wherein i is an integer.

15. The apparatus of claim 14, wherein a value of i ranges from 0 to 9.

16. The apparatus of claim 11, wherein the signal characteristic of the current frame meets the preset modification condition when the current frame is not a transition frame.

17. The apparatus of claim 16, wherein the current frame is a transition frame when a tilt of a previous frame of the current frame is greater than a tilt threshold value and a coder type of the current frame is transient.

18. The apparatus of claim 16, wherein the current frame is a transition frame when a tilt of the previous frame of the current frame is greater than a first tilt threshold value and a tilt of the current frame is less than a second tilt threshold value.

19. The apparatus of claim 16, wherein the current frame is a transition frame when a tilt of a previous frame of the current frame is less smaller than a first tilt threshold value and a coder type of the previous frame is one of four types of VOICED, GENERIC, TRANSITION or AUDIO, and wherein a tilt of the current frame is greater than a second tilt threshold value.

20. The apparatus of claim 11, wherein the first modification weight is determined according to a ratio between one of the LSF differences of the current frame of the audio signal and one of the LSF differences of the previous frame of the current frame of the audio signal.

* * * * *